United States Patent
Sirles

[11] 3,961,668
[45] June 8, 1976

[54] CORRECTIONAL PAD

[76] Inventor: Robert A. Sirles, 2873 Mary St., Omaha, Nebr. 68112

[22] Filed: Jan. 31, 1974

[21] Appl. No.: 438,362

[52] U.S. Cl. ............................ 168/4; 168/DIG. 1
[51] Int. Cl.² ........................................ A01L 1/00
[58] Field of Search ............... 168/11, 13, 12, 26, 168/27, 28, 4, DIG. 1

[56] References Cited
UNITED STATES PATENTS

| | | | |
|---|---|---|---|
| 144,833 | 11/1873 | Cooke | 168/DIG. 1 |
| 1,825,186 | 8/1931 | Harsem | 168/4 |
| 3,200,885 | 8/1965 | Johnson | 168/DIG. 1 |
| 3,302,723 | 2/1967 | Renkenberger et al. | 168/DIG. 1 |
| 3,476,190 | 11/1969 | Jenny et al. | 168/4 |
| 3,486,561 | 12/1969 | Kulak | 168/DIG. 1 |

Primary Examiner—Louis G. Mancene
Assistant Examiner—Jack Q. Lever
Attorney, Agent, or Firm—Zarley, McKee, Thomte & Voorhees

[57] ABSTRACT

A correctional pad for use on the hoof of an animal such as a horse or the like is disclosed comprising a resilient body member having a side wall with a bottom wall extending laterally therefrom. The body member is comprised of a material such as Neoprene or the like so that the side wall member may be adhesively secured to the side of the animal's hoof so that the bottom wall member will be selectively positioned beneath the hoof to alter the flight of the animal's foot. One of the embodiments is substantially straight and is L-shaped in cross-section. A further embodiment is also L-shaped in cross-section but it is curved along its length so as to conform to the curvature of the animal's hoof. The thickness of the bottom wall member may be increased by laminating additional thicknesses thereon.

7 Claims, 5 Drawing Figures

CORRECTIONAL PAD

BACKGROUND OF THE INVENTION

This invention relates to a correctional pad and more particularly to a correctional for use on the hoof of an animal such as a horse or the like. If the flight of the horse's foot is improper, certain correctional remedies must be taken in an effort to correct the situation. Heretofore, metal horseshoes could be actually forged so as to have proper configurations to cause the flight of the horse's foot to be altered. However, it is becoming more and more difficult to find persons who are sufficiently skilled so as to be able to properly forge a horseshoe which will fit the animal.

Therefore, it is a principal object of the invention to provide a correctional pad for use on the hoof of an animal such as a horse, cow, etc.

A further object of the invention is to provide a correctional pad for use on the hoof of a horse or the like which is secured to the side of the hoof by adhesive or the like.

A further object of the invention is to provide a correctional pad for use on the hoof of an animal which does not interfere with the contraction and expansion of the hoof.

A further object of the invention is to provide a correctional pad for use on the hoof of an animal which is easily secured thereto.

A further object of the invention is to provide a correctional pad for use on the hoof of an animal which is resilient.

A further object of the invention is to provide a correctional pad for use on the hoof of an animal which may be selectively positioned on the hoof so as to alter the flight of the animal's foot.

A further object of the invention is to provide a correctional pad for use on the hoof of an animal which conforms to the configuration of the hoof.

A further object of the invention is to provide a correctional pad for use on the hoof of an animal which is economical of manufacture, and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENTS

The numeral 10 refers generally to a hoof of an animal such as a horse or the like. Hoof 10 includes a side portion 12 and a bottom portion 14.

For purposes of description, the numerals 16, 18, 20, 22, 24, 26 and 28 will refer to the toe, outside toe, inner toe, outside quarter, inner quarter, outside heel and inner heel portions of the four feet respectively.

Figures 1, 2:
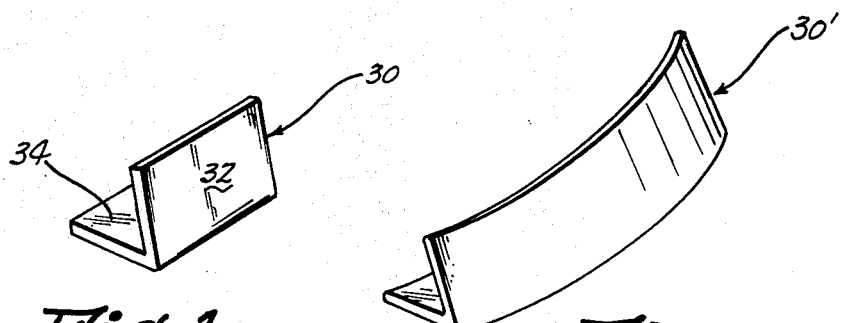
FIG. 1 is a perspective view of one form of the invention.
FIG. 2 is a perspective view of a modified form of the invention.
Figures 3, 4:
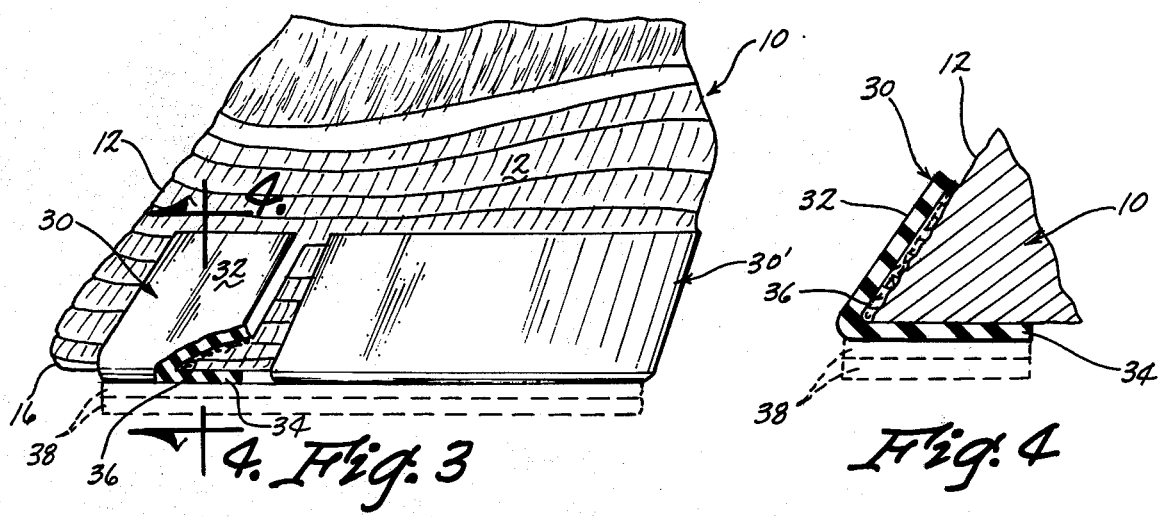
FIG. 3 is a side view illustrating the embodiments of FIGS. 1 and 2 secured to the hoof of an animal with the broken lines indicating additional thicknesses which may be laminated to the invention.
FIG. 4 is a sectional view seen on lines 4 — 4 of FIG. 3.

In FIG. 1, the numeral 30 refers to one form of the correctional pad comprised of a semi-resilient material such as Neoprene, rubber or the like. Pad 30 comprises a side wall 32 and a bottom wall 34 extending laterally inwardly from the lower end thereof. As seen in FIG. 4, side wall 32 and bottom wall 34 do not form a right angle but side wall 32 extends upwardly and inwardly from bottom wall 34 so as to define an acute angle.

In FIG. 2, the numeral 30' refers to a modified form of the correctional pad. Correctional pad 30' is identical to correctional pad 30 except that it is somewhat longer and is curved along its length so as to conform to the curvature of the outside portion of the animal's hoof.

The correctional pads are secured to the hoof 10 such as illustrated in FIG. 3. The side of the hoof generally indicated at 36 would be cleaned prior to installation of the pad 30. Adhesive such as glue or the like is placed on the inside surface of side wall 32 and the pad 30 is placed adjacent the hoof so that bottom wall 34 is positioned beneath the hoof at the desired location to correctly alter the flight of the foot. If it is desired to have an increased thickness for bottom wall 34, it is simply ncessary to laminate or otherwise secure additional thicknesses to the underside of bottom wall 34 such as generally indicated by the reference numeral 38 in FIG. 3. If so desired, one of the thicknesses 38 could have a greater thickness at its outside edge.

Figure 5:
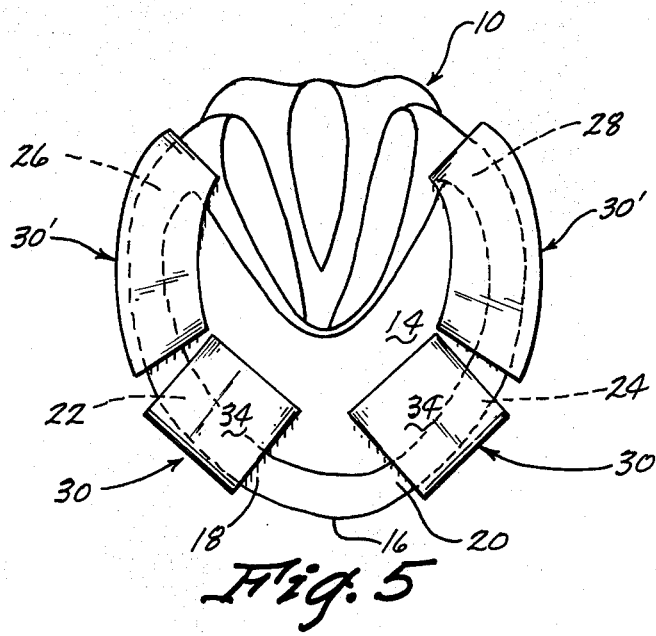
FIG. 5 is a bottom view of the hoof of a horse indicating possible locations for the correctional pads of FIGS. 1 and 2.

After the animal has been examined, the correctional pads 30 or 30' may be secured to the hoof such as illustrated in FIGS. 3 and 5 dependent upon the determination of the needed correction. Applicant will not attempt to go into the various types of improper flights of the foot with the positions in FIG. 5 merely indicating possible positions for securing the pads.

The pads are easily installed on the hoof by anyone and do not require the services of a person skilled in the art of forging horseshoes. The pads do not interfere with the contraction or expansion of the hoof and do not prevent moisture from being absorbed by the hoof since there is no adhesive between bottom wall 34 and the bottom of the hoof. Thus it can be seen that a novel correctional pad for use on the hoof of an animal has been provided which accomplishes at least all of its stated objectives.

I claim:

1. A correctional pad for use on the hoof of an animal, comprising,
   a side wall member having upper and lower ends,
   a bottom wall member extending laterally from the lower end of said side wall member,
   said side wall member being comprised of a material which may be adhesively secured to the side of the animal's hoof,
   said bottom wall member extending beneath the hoof in a preselected position to alter the flight of the animal's foot, said side wall member having a length substantially less than the side wall of the hoof, said bottom wall member having a length substantially less than the bottom of the hoof.

2. The device of claim 1 wherein said correction pad is generally L-shaped in cross-section.

3. The device of claim 1 wherein said correctional pad is semi-resilient.

4. The device of claim 1 wherein said pad is comprised of a Neoprene material.

5. The device of claim 1 wherein said pad is comprised of a rubber composition material.

6. The device of claim 1 wherein said pad is elongated, said side wall member being curved along its length.

7. The device of claim 1 wherein said bottom wall member is comprised of a plurality of members laminated together in a superposed relationship.

* * * * *